US006742474B2

United States Patent
van den Berg et al.

(10) Patent No.: US 6,742,474 B2
(45) Date of Patent: Jun. 1, 2004

(54) CONSTRUCTION FOR AUTOMATICALLY MILKING ANIMALS

(75) Inventors: Karel van den Berg, Bleskensgraaf (NL); Alexander van der Lely, Rotterdam (NL); Renatus Ignatius Josephus Fransen, Vlaardingen (NL); Wilhelmus Johannes Adrianus van Lier, Delft (NL)

(73) Assignee: Lely Enterprises A.G. A Swiss Limited Liability Co., Zug (CH)

( * ) Notice: Subject to any disclaimer, the term of this patent is extended or adjusted under 35 U.S.C. 154(b) by 0 days.

(21) Appl. No.: 10/109,695

(22) Filed: Apr. 1, 2002

(65) Prior Publication Data

US 2002/0139309 A1 Oct. 3, 2002

(30) Foreign Application Priority Data

Mar. 30, 2001 (NL) .............................. 1017749

(51) Int. Cl.$^7$ ................................. A01J 5/007
(52) U.S. Cl. ................................... 119/14.08
(58) Field of Search ............................. 119/14.08, 14.1

(56) References Cited

U.S. PATENT DOCUMENTS

| | | | | |
|---|---|---|---|---|
| 5,042,428 A | * | 8/1991 | Van der Lely et al. ... | 119/14.08 |
| 5,379,721 A | * | 1/1995 | Dessing et al. .......... | 119/14.08 |
| 5,606,932 A | * | 3/1997 | van der Lely ........... | 119/14.14 |
| 5,718,186 A | * | 2/1998 | van der Lely ........... | 119/14.08 |
| 5,743,209 A | * | 4/1998 | Bazin et al. ............. | 119/14.08 |
| 5,832,868 A | * | 11/1998 | Oosterling ............... | 119/14.02 |
| 5,873,323 A | * | 2/1999 | van den Berg et al. ... | 119/14.02 |
| 6,038,030 A | * | 3/2000 | van den Berg ............ | 356/425 |
| 6,055,930 A | * | 5/2000 | Stein et al. ............... | 119/14.08 |
| 6,418,876 B1 | * | 7/2002 | Hall et al. ................ | 119/14.08 |
| 6,431,116 B1 | * | 8/2002 | Nilsson ................... | 119/14.08 |

FOREIGN PATENT DOCUMENTS

| | | | | |
|---|---|---|---|---|
| EP | 576086 A2 | * | 12/1993 | ............. A01J/7/00 |
| WO | WO 9419931 A1 | * | 9/1994 | ............. A01K/1/12 |
| WO | PCT/SE96/00629 | | 5/1996 | |
| WO | WO 9931967 A1 | * | 7/1999 | ............. A01J/5/017 |

* cited by examiner

Primary Examiner—Charles T. Jordan
Assistant Examiner—John W. Zerr
(74) Attorney, Agent, or Firm—Penrose Lucas Albright

(57) ABSTRACT

A system for automatically milking animals is provided with a milking robot and a computer which is capable of being connected to a plurality of measuring instruments for a plurality of functions of the system and physiological conditions of the animals being milked. Monitoring programs for the functions and conditions are installed in a computer which, based on comparison reference data, determines that one or more components of the system is likely to fail or otherwise malfunction and reports on abnormal physiological conditions of animals being milked by the system. As a result of the computer determinations, diagnoses of the likelihood of failure or other malfunction of one or more of the system's components, and of abnormal conditions of the animals being milked, are transmitted to interested parties including a user and a service mechanic together with the appropriate actions to be taken.

89 Claims, No Drawings

CONSTRUCTION FOR AUTOMATICALLY MILKING ANIMALS

FIELD OF THE INVENTION

The invention relates to an automatic milking system for automatically milking animals.

BACKGROUND OF THE INVENTION

European Patent Application No. EP-A-0 576 086, of van der Lely, published Dec. 29, 1993, describes an automated milking apparatus in which malfunctions that occur are reported with the aid of a control system. The disadvantage of such apparatus is, inter alia, that it only reports that a particular component is not functioning. International Patent Application No. PCT/SE98/02386, Filed Dec. 18, 1998, International Publication No. WO 99/31967, published Jul. 1, 1999, of Eriksson, discloses an apparatus in which a cumulative value in relation to the useful life of a component is updated. When a threshold value has been reached, there is generated a signal indicating that the component has to be replaced. The disadvantage of this system is, inter alia, that the actual wear is not taken into account, so that components having a great divergence in their anticipated life are often replaced unnecessarily precipitately

SUMMARY OF THE INVENTION

The object of the invention is the improvement and further automation of the systems mentioned above. According to the invention this objective is achieved by monitoring and comparing data transmitted to a computer from measuring instruments provided in the automated milking apparatus relating to its functioning and on the basis thereof prognosticating anticipated failure of functions of the apparatus. The early determination of a diagnosis enables a user to be warned or a service mechanic to attend to required measures to avoid anticipated malfunctions, or both to occur. This enhances the reliability of the apparatus. Moreover, it may appear that a number of corrective measures can be delayed and taken care of during one visit by the service mechanic, which is cost-saving.

DETAILED DESCRIPTION OF THE PREFERRED EMBODIMENTS OF THE INVENTION

Systems for automatically milking animals, such as cows, by means of a milking robot are well known by those skilled in the art. A milking robot is provided with means for automatically connecting teat cups to the teats of an animal to be milked. Said means comprise, for example, a robot arm and a sensor for detecting the position of the teats of the animal to be milked relative to the teat cups. There are further provided control means and other well known components such as cleaning means, a feeding device, an animal identification system and a milk reservoir. The control means may comprise a computer which is connected, or capable of being connected, with a number of measuring instruments (sensors) which are related to functions of the apparatus, such as the milking process or parts thereof, the pre-treatment of an animal to be milked, the cleaning of the teats of an animal to be milked, the cleaning of the teat cups, the feeding of an animal to be milked, and measurements of the quantity of milk yielded.

A monitoring program for said functions is programmed or installed in the computer. The computer includes reference data which are related to said functions. The measuring instruments which are also related to said functions provide data to the computer. With the aid of the monitoring program the computer is suitable for determining, on the basis of a comparison of data from one or more of the measuring instruments with the reference data, a diagnosis in relation to an anticipated fault in one or more of said functions. The monitoring program attributes a diagnosis for an anticipated malfunction to certain combinations of measurement data and reference data, as will be elucidated hereinafter. On the basis of the diagnosis it is possible to intervene before the malfunction actually occurs.

The computer may be programmed such that the diagnosis comprises the anticipated nature of the malfunction, the anticipated point of time or an anticipated time interval for the malfunction to occur. The computer is preferably programmed so that the diagnosis comprises a warning to a user or a service mechanic, or both. In this manner the system or function or component involved is checked in time (before the malfunction actually occurs) whether action has to be taken in relation to a particular function or a particular component. In clear cases the diagnosis may also comprise a concrete instruction to the user or the service mechanic, or both, in order to prevent the anticipated malfunction. Such an instruction may comprise an action to be taken by the user or the service mechanic, as appropriate, and a time indication within which the action should be taken.

In a preferred embodiment of the invention the diagnosis comprises an indication to the user or the service mechanic or to both to check the condition of a component which is related to the anticipated malfunction and to repair or to replace said component if necessary. Thus it is possible to establish in an early stage whether the actual wear or abnormality of the component requires its repair or replacement of the relevant component at once. When it appears that for example the actually occurred wear is smaller than would have been anticipated on the basis of the age or the use of the component, it may be decided to continue to use the relevant component for a certain further time. This is cost-saving, of course. The monitoring program supplies an appropriate warning in an early stage so that malfunctions in the system can be avoided.

The computer may be suitable for selecting the diagnosis out of an available collection of diagnoses related to said functions. A great number of diagnoses of possible malfunctions may be stored in the computer. The collection of diagnosis may then at least partially depend on the size of the herd of animals to be milked. With a small herd there may be other problems leading to malfunctions than with a large herd. In this manner the number of animals that will make use of the system can be taken into account.

The system is preferably provided with means enabling it to adapt or to extend the available collection of diagnoses, or to do both. The system may thus be adapted to the specific needs and circumstances of the dairy farm where the construction is used. With some dairy farms malfunctions may occur that are hardly likely to occur at other dairy farms. The means may be suitable for adapting diagnoses or adding new diagnoses on the basis of the patterns of data from the measuring instruments established during the use of the apparatus. When it appears for example that during the failure-free use of a certain component there is continuously generated a malfunction diagnosis, then the computer may conclude that this diagnosis is not correct. In this manner the disadvantageous results of incorrect reference data can be corrected automatically. It is also possible to add a corresponding, improved diagnosis when a particular fault in a particular function occurs a number of times earlier than would have been expected on the basis of the existing diagnosis. The collection of diagnosis is thus automatically adapted to the local circumstances of the construction.

The means may be suitable for adapting or extending the available collection of diagnoses, or doing both, based on the size of the herd of animals to be milked or the (possibly measured) intensity with which the apparatus is used. The fact is that these parameters may strongly influence the nature and the frequency of anticipated malfunctions. Of course, there are also other influences, such as, for example, the degree of contamination of the environment in which the system is used. In a clean shed fewer problems will occur than in a highly contaminated one.

The apparatus is suitable for indicating, for example visually or acoustically or both, the diagnosis determined by the computer, or at least the instruction pertaining thereto.

The measuring instruments may comprise sensors, clocks or counters or a combination thereof. There may for example be provided a sound sensor by means of which it is possible to detect sounds that deviate from reference patterns. On the basis of the measurements it is possible for example to generate a diagnosis having for instruction "check vacuum pump" or "replace pulsator within 24 hours." It is also possible to use sensors for measuring the electricity consumption of certain components, the air consumption, the water consumption, the milk-discharge, the feed supply, the conductivity of cleaning liquid, the temperature in the bulk milk cooling tank, the pulsation pattern in the teat cups, etc. With the aid of time sensors or clocks it is possible to determine for example (cumulative) consumption times of components, connection times of the teat cups, time required for establishing a vacuum, etc. By means of counting sensors or counters it is possible for example to determine the number of pulsations of a pulsator or the number of times a component is used.

The reference data may comprise an interval for a measured value to be determined by means of one or more measuring instruments. The monitoring program selects for example the diagnosis "sound level too high; check vacuum pump" when the measured sound level of a vacuum pump is above 70 decibels for at least 30 seconds. The reference data may also comprise an anticipated life or an anticipated failure-free useful life for a function-related component of the construction. When the point of time is reached at which, for example, 90% of the useful life of a component has elapsed, the instruction may be "check the condition of component within six hours and determine whether it must be replaced; if not, provide new time interval for further use."

The computer is preferably suitable for determining in a parallel manner more than one diagnosis and for attributing an urgency to each diagnosis. The system is then capable of indicating the diagnosis determined or at least the instructions pertaining thereto in order of urgency. This enhances the user-friendliness of the construction.

The apparatus may comprise a number of components known per se, such as coils and motors for driving and controlling other components, a compressor, a vacuum pump and an air system connected therewith with air lines and valves, a pulsator wherein pulsation speed and pulsation ratio are adjustable, a cleaning system with a water pump, a water tank with a three-way-valve and liquid lines, teat cups with liners, and openings to receive teats, a tilting mechanism and a cord, milk lines, milk meters, milk filters, a milk glass with a float, a bulk milk cooling tank with a contents meter, a feeding system with a feeding trough, a feed auger and a weighing cell, a floor element with a weighing device and weighing cells, conductivity sensors, cleaning means with lye or acid or both, milk separation means, a laser measuring system for determining teat positions with a laser widow, lifting piston and cylinder members for the teat cups, stepper motors and other drive mechanisms for having certain movements performed by certain components, milk flow sensors, milk pulsation tubes with tube shut-off valves, a bulk milk cooling tank with a cooling system and a cleaning system, an entrance and an exit with gates of a milking compartment, an animal identification system, etc.

The computer may for example be programmed such that when one or more measuring instruments establish an increasing electricity consumption, it is determined that rinsing or motors or both should be checked." But, the diagnosis or warning issued need not contain literally the words "check rinsing or motors or both," it may simply indicate that a problem with rinsing or motors or both may be anticipated.

From the foregoing, it will be appreciated that the invention relates to an apparatus for automatically milking animals which is provided with a milking robot and a computer which is capable of being connected with a number of measuring instruments that are related to a number of condition parameters relating to an animal to be milked as well as to components of the apparatus. According to the invention a monitoring program for said parameters is installed in the computer, with the aid of which the computer is suitable for determining, on the basis of a comparison of data from one or more of the measuring instruments with reference data related to said parameters, a diagnosis based on an anticipated undesired deviation in one or more of said parameters. Again the early determination of a diagnosis enables a user or a veterinarian to be warned so that one or the other or both can take timely measures to avoid or ameliorate the anticipated undesired problems.

The computer may further be suitable for continuously adapting the reference data on the basis of measured quantities. The computer may also be suitable for automatically generating reference data. The reference data may be based on the herd of animals to be milked or on the intensity with which the apparatus is used.

The construction is preferably provided with means for transmitting the diagnosis determined by the computer by telephone or as SMS-message, or both, to a user or a service mechanic, or both. In this manner the user or the service mechanic, or either, as appropriate, is able to react promptly.

The computer may be programmed so that when one or more measuring instruments reflect a slowly starting milk flow profile, the computer recommends: "prolong pretreatment."

Although we have disclosed the preferred embodiments of our invention, it is to be understood that is capable of other adaptations and modifications within the scope of the following claims:

We claim:

1. An apparatus for the automated milking of milk producing animals which comprises components which include a milking robot, sensor means for automatically sensing the locations of teats of each said animal milked by the apparatus, teat cups carried by said milking robot which are connected to each relevant animal's teats as controlled by said sensor means, cleaning means for automatically cleaning the teats and udders of said animals milked by the apparatus, a vacuum pump for providing milking vacuum and pulsating vacuum to said teat cups, a computer which controls the process of automated milking of said animals, at least one further component which carries out at least one function of the apparatus, monitoring means for monitoring the functioning of said at least one component, data transmitting means for transmitting data from said monitoring means to said computer, a program in said computer for receiving said data and comparing it with further data provided said computer for prognosticating when a said component is likely to malfunction, and diagnostic information transmission means that transmits information to interested parties when at least one of said components is likely to malfunction and should be repaired or replaced.

2. An apparatus in accordance with claim 1, wherein said computer is programmed so that said information which comprises the anticipated nature of said likely malfunction of a said component is transmitted to said interested parties.

3. An apparatus in accordance with claim 1, wherein said transmitted information to said interested parties comprises an anticipated time when said component is likely to malfunction.

4. An apparatus in accordance with claim 1, wherein said transmitted information comprises a warning and said interested parties comprise a user or a service mechanic, or both.

5. An apparatus in accordance with claim 1, wherein said transmitted information to said interested parties comprises an instruction to avoid an anticipated malfunction of the component involved.

6. An apparatus in accordance with claim 5, wherein said instruction comprises an action to be taken by interested parties comprising a user or a service mechanic, or both.

7. An apparatus in accordance with claim 4, wherein said transmitted information includes instructions to check the condition of said component which is likely to malfunction and to take action to repair or to replace such component if necessary.

8. An apparatus in accordance with claim 5, wherein said instruction includes a time duration within which said action is to be taken.

9. An apparatus in accordance with claim 1, wherein a collection of possible diagnoses of malfunctions is stored in said computer.

10. An apparatus in accordance with claim 9, wherein a content of said collection is based on the size of the group of animals to be milked by the apparatus.

11. An apparatus in accordance with claim 10, which comprises means to alter the content of said collection in said computer.

12. An apparatus in accordance with claim 11, comprising means for adding diagnoses to the content of said collection on the basis of patterns of data received in said computer from said monitoring means for said component of the apparatus.

13. An apparatus in accordance with claim 9, comprising means to alter said collection based on the intensity with which the apparatus is used.

14. An apparatus in accordance with claim 1, wherein said computer is programmed to be suitable for indicating an established diagnosis for said components which are likely to malfunction.

15. An apparatus in accordance with claim 1, wherein transmitted information to said interested parties includes information pertaining to an established diagnosis for said components which are likely to malfunction.

16. An apparatus in accordance with claim 1, comprising means for transmitting said information to said interested parties in a manner so that it is perceptible to said parties.

17. An apparatus in accordance with claim 1, wherein at least one of said monitoring means comprises a sensor.

18. An apparatus in accordance with claim 1, wherein said monitoring means comprises at least one clock.

19. An apparatus in accordance with claim 1, wherein said monitoring means comprises at least one counter.

20. An apparatus in accordance with claim 1, wherein said monitoring means comprises at least one measuring instrument.

21. An apparatus in accordance with claim 1, wherein said data provided said computer includes the anticipated period of time of failure-free use of said components.

22. An apparatus in accordance with claim 1, wherein said computer is suitable for determining in a parallel manner more than one diagnosis.

23. An apparatus in accordance with claim 22, wherein said data provided said computer includes the urgency relating to transmitted information to interested parties.

24. An apparatus in accordance with claim 23, wherein said data provided said computer includes an order of urgency relating to information transmitted to interested parties.

25. An apparatus in accordance with claim 1, wherein when said monitoring means detects an increasing electricity consumption of one of said components, the transmitted information to said parties includes a direction that motors or rinsing functions or both of the apparatus be checked.

26. An apparatus in accordance with claim 1, wherein when said monitoring means detects an air deviating consumption curve from any of said components, the transmitted information to said interested parties includes a direction to check an air system or a compressor, or both.

27. An apparatus in accordance with claim 1, wherein when said monitoring means detects a deviating water consumption curve, the transmitted information to said interested parties includes directions to check for water leakage or obstruction or both.

28. An apparatus in accordance with claim 1, wherein said monitoring means monitors milk discharge from said teat cups to a bulk milk tank and when a malfunction is monitored in said discharge, the transmitted information to said interested parties includes a direction to check for leakage or obstruction to a milk filter or both.

29. An apparatus in accordance with claim 1, wherein one of said components comprises a feed supply and when said monitoring means detect a malfunction in said feed supply component, the transmitted information to said interested parties comprises directions to check for leakage or obstruction or both of a feed auger in said feed supply component.

30. An apparatus in accordance with claim 1, wherein when said monitoring means detects a deviating sound measurement, the transmitted information to said interested parties comprises instructions to check said vacuum pump or said pulsator.

31. An apparatus in accordance with claim 1, wherein one of said components comprises a water tank wherein when said monitoring means detects a deviating filling times of said water tank, transmitted information to such effect is transmitted by said information transmission means to said interested parties.

32. An apparatus in accordance with claim 1, which comprises a weighing floor wherein when said monitoring means detects a deviating weight of animals to be milked said transmitted information by said transmission means to interested parties indicates that said weighing floor is jammed or otherwise malfunctioning.

33. An apparatus in accordance with claim 1, comprising a feed weighing cell wherein when said monitoring means comprises a deviating signal pattern from a said feed weighing cell, the transmitted information to interested parties includes information to the effect that a feeding trough which is a component of the apparatus is jammed or said feed weighing cell is malfunctioning.

34. An apparatus in accordance with claim 1, which comprises a box floor as a said component wherein when said monitoring means detects a positive drifting the zero level weight of said box floor, said transmitted information to said interested parties includes information to the effect that there is an accumulation of dirt on said box floor.

35. An apparatus in accordance with claim 1, wherein when said monitoring means detects an increased air consumption from said cleaning means, the information transmitted to said interested parties calls attention to leaking valves in said cleaning means.

36. An apparatus in accordance with claim 1, which comprises as a component a milk pipeline system and cleaning fluids including pre-rinsing water therefor, wherein when said monitoring means comprises increased electrical conductivity of said pre-rinsing water at the end of pre-rinsing, the transmitted information to said interested parties is to the effect that pre-rinsing of said pipeline system is insufficient.

37. An apparatus in accordance with claim 1, which comprises a milk pipeline system and a cleaning fluid for said milk line pipe system as a component which is monitored by said monitoring means, when said monitoring means detects an increased conductivity when said cleaning fluid comprises main cleaning water the transmitted information to said interested parties is to the effect that said main cleaning water is deficient in that it has too low of a lye or acid concentration or that conductivity sensors in said milk pipeline system have drifted.

38. An apparatus in accordance with claim 1, which comprises a milk pipeline system and cleaning fluids therefor including post-rinsing water as a component of the apparatus, wherein when said monitoring means detects increased conductivity of said post-rinsing water the transmitted information to said interested parties includes information that the post rinsing is insufficient or is contaminated or that conductivity sensors included in said monitoring means for said post-rinsing water have drifted.

39. An apparatus in accordance with claim 1, wherein said monitoring means includes sensors in components for receiving the flow of milk from animals being milked by the apparatus and when said sensors for the flow of milk indicate automatic consecutive separation of milk from various animals, the transmitted information to said interested parties includes instructions to check said sensors for said milk flow.

40. An apparatus in accordance with claim 1, comprising a weighing floor as a component of the apparatus wherein said monitoring means includes movement sensors in said weighing floor and when said movement monitors indicate more movement than average by animals being milked by the apparatus, the transmitted information to said interested parties includes directions to check the vacuum level of said vacuum pump or the condition of the liners of said teat cups, or both.

41. An apparatus in accordance with claim 1, which includes a feeding trough as a component of the apparatus wherein when said monitoring means for said feeding trough indicates that animals are not taking feed from said feeding trough, the transmitted information to said interested parties includes directions to check a weighing cell to which said monitoring means is connected in said feeding trough.

42. An apparatus in accordance with claim 1, which comprises as components of the apparatus a milk glass, a milk pump to pump milk from said milk glass to a bulk milk cooling tank and a milk filter in a line containing said milk pump, said monitoring means containing means for determining the flow from said milk glass to said bulk milk cooling tank whereby when said sensor in said line indicates a defective flow of milk from said milk glass to said bulk milk cooling tank, the transmitted information to said interested parties includes a direction to check said milk line for an obstruction including an obstruction in said milk filter or in said bulk milk cooling tank or in said line.

43. An apparatus in accordance with claim 1, which comprises a box floor on which each animal stands when being milked in the apparatus, said measuring means measuring a deviation of the center of gravity of said box floor wherein when said monitoring means detects deviation of the center of gravity of said box floor with an animal thereon, the transmitted information to said interested parties includes directions to check the amount of feed being supplied to a said milk producing animal when being milked therein or a feed auger that supplies said feed to a said milk producing animal being milked in the apparatus or a weighing cell connected to said monitoring means in a trough to which said feed is supplied, as being defective.

44. An apparatus in accordance with claim 1, which comprises a weighing floor on which said animals stand when being milked and a feed trough having feed augers from which said animals consume feed while being milked, said monitoring means monitoring the connection time of said teat cups and movement on said weighing floor wherein when said measuring means detects a longer time for said teat cups being connected than average and more movement in said weighing floor on the average for a relevant animal, the transmitted information to said interested parties directs that said feed augers be checked and the apparatus also be checked for the presence of vermin.

45. An apparatus in accordance with claim 1, wherein said monitoring means measures the flow of milk from an animal being milked by the apparatus and when said milk flow as so monitored by said monitoring means is determined by said computer to have deviated from a pattern for a said animal being milked, said transmitted information to interested parties directs that pulsation adjustments be checked, a feed use-up control be checked, a feed auger for supplying feed to said apparatus for consumption by said animal be checked, and a weighing cell in a trough for receiving said feed be checked.

46. An apparatus in accordance with claim 1, wherein said monitoring means monitors the vacuum in said teat cups wherein when said monitoring means detects an absence of vacuum in one of said teat cups after several attempts to connect such teat cup to the appropriate teat of a said animal being milked, said transmitted information to interested parties directs that a tilting mechanism for said teat cup be checked, that a cord connected to said teat cup be checked and that a laser window of said sensor means be checked.

47. An apparatus in accordance with claim 1, wherein said monitoring means monitors the period of time required to connect each said teat cup with an appropriate teat of said animal and when said monitoring means detects that one of said teat cups is connected slower compared to the other said teat cups used in the same milking process, said transmitted information to said interested parties directs that the position of said slower connected teat cup or that its cup lining be checked.

48. An apparatus in accordance with claim 1, wherein said monitoring means monitors the milking speed and the average milk flow for each animal being milked by the apparatus wherein when it is detected that said milking speed or said average milk flow, or both, are lower than average, said transmitted information to said interested parties includes instructions to check the milking vacuum levels, pulsation adjustments and liners of said teat cups.

49. An apparatus in accordance with claim 1, wherein said monitoring means monitors the connection time of all of said teat cups used for milking an animal and when a period of time which is more than a predetermined length of time is detected, said transmitted information to said interested parties is that a laser window for said sensor means may be clouded or that a lifting piston and cylinder for said teat cups has leakage.

50. An apparatus in accordance with claim 1, wherein said monitoring means monitors the milk flow from said teat cups and when a deviating pattern of milk flow from said teat cups is detected for several of said animals being milked by the apparatus, said transmitted information to said interested parties directs that the liner and opening to receive a teat in said teat cup wherein said deviating signal pattern of milk flow is detected be checked.

51. An apparatus in accordance with claim 1, wherein said monitoring means monitors a pulsation pattern of said pulsating vacuum and when a deviation from a predetermined pulsation pattern is detected by said monitoring means, said transmitted information to said interested parties directs that the vacuum level and a vacuum line to a pulsator providing said pulsating vacuum be checked.

52. An apparatus in accordance with claim 1, wherein said monitoring means detects a build-up of vacuum by said vacuum pump and when said build-up does not conform to data provided said computer, said transmitted information to said interested parties directs that said vacuum pump and leakage air into lines providing said milking vacuum and said pulsating vacuum be checked.

53. An apparatus in accordance with claim 1, wherein said computer is programmed to provide movements of said components and when said monitoring means detects a deviation in the time required for a said movement of a said component, said transmitted information to said interested parties is to the effect that a driving mechanism for the relevant component is defective or that there is leakage in a fluid driving the relevant component.

54. An apparatus in accordance with claim 1, wherein a bulk milk cooling tank comprises a component of the apparatus and said monitoring means monitors the temperature of said tank, the time required for cleaning said tank, the temperature of the fluids that clean said tank and milk quantity alarms of said tank whereby when said monitoring means detects a deviation of data from said bulk milk cooling tank from the relevant said further data in said computer, said transmitted information to said interested parties directs that a cooling system of said bulk milk cooling tank and a cleaning system of said bulk milk cooling tank be checked.

55. An apparatus in accordance with claim 1, wherein said monitoring means includes a milk meter and a contents meter of a bulk milk cooling tank which comprises a component of the apparatus and when a discrepancy is detected between milk yield data from said milk meter and data from said contents meter, said transmitted information to said interested parties directs that said milk meter and said contents meter be checked.

56. An apparatus in accordance with claim 1, which comprises a stepper motor as a component of the apparatus wherein said monitoring means monitors said stepper motor whereby when there is determined an error in the operation of said stepper motor by said monitoring means, said transmitted information to said interested parties includes that said stepper motor be checked.

57. An apparatus in accordance with claim 1, wherein said monitoring means includes means for monitoring the frequency of use of said milking robot and when said frequency is reduced to zero, said transmitted information to said interested parties is that an animal obstructs the entrance to a milking compartment which includes said milking robot or that an entrance gate or an exit gate from said milking compartment is defective.

58. An apparatus in accordance with claim 1, wherein an animal identification system is a component of the apparatus which is monitored by said monitoring means and wherein when said monitoring means fails to identify a plurality of animals that visit the apparatus, said transmitted information to said interested parties is to the effect that said animal identification system should be checked.

59. An apparatus in accordance with claim 1, wherein when said monitoring means monitors said pulsating vacuum and detects a deviating pulsation pattern of said pulsating vacuum, said transmitted information to said interested parties is to check a liner of a milk pulsation tube and shut-off valves of said pulsation tube.

60. An apparatus in accordance with claim 1, which comprises means for weighing an animal being milked by the apparatus and means for measuring the quantity of milk yielded by such animal during the milking process as components of the apparatus, said monitoring means including means for providing data of the weight loss of said animal be reason of being milked by the apparatus, the quantity of milk yielded by such animal during the milking process, the amount of feed consumed by such animal during the milking process, and the weight of excrement from such animal which occurs during the milking process wherein when the data of what the animal should weigh and the data provided by a milk meter of the milk yielded by the animal do not correspond, said transmitted information to said interested parties is to the effect that the weighing sensors to provide the above indicated weight data should be checked.

61. An apparatus in accordance with claim 1, wherein said monitoring means senses milk flow from a milking glass to a bulk milk cooling tank which are included as components of the apparatus wherein said milk flow is detected to have increased beyond its usual maximum, as stored in said further data, the transmitted information to said interested parties should direct that a milk float in said milk glass be checked.

62. An apparatus in accordance with claim 1, wherein said monitoring means includes means for monitoring the milk flow between a milk glass and a bulk milk cooling tank which are included as components of the apparatus and said monitoring means detects that said milk flow between said milk glass and said bulk milk cooling tank has decreased so as to be substantially less than it should be, said transmitted information to said interested parties is that said milk float in said milk glass should be checked.

63. An apparatus in accordance with claim 1, wherein said monitoring means includes a milk flow sensor for detecting the commencement of milk flow in each said teat cup and when said monitoring means detects an increased period of time between the generation of a vacuum in a teat cup and the commencement of milk flow from a teat received therein, said transmitted information to said interested parties is to the effect that there may be insufficient sensitivity of a relevant milk flow sensor in such teat cup.

64. An apparatus in accordance with claim 1, wherein said monitoring means includes a milk flow sensor in each said teat cup and when said milk flow detector in a relevant teat cup detects a shorter period of time between the generation of a vacuum in such teat cup and the commencement of milk flow from the teat received therein in combination with a longer milking time for the teat in said relevant teat cup, said transmitted information to said interested parties is to the effect that the relevant said milk flow sensor is too sensitive.

65. An apparatus in accordance with claim 1, wherein said monitoring means includes in each said teat cup sensing means for measuring the generation of a vacuum in such teat cup and the commencement of the flow of milk in such teat cup and also in other said teat cups connected to an animal being milked wherein when said sensing means in a relevant teat cup detects a longer than expected time between the generation of a vacuum in such teat cup and the commencement of the flow of milk therein compared to other similar data from other teat cups connected to the same animal, the transmitted information to said interested parties comprises that there is leakage in the teat cup liner for the relevant teat cup or its pulsation tube or that a pulsator therefor is not effective.

66. An apparatus in accordance with claim 1, wherein said monitoring means includes sensor means which detect the period of time in each said teat cup between the generation of a vacuum therein and the commencement of milk flow therein and from said sensor means data of substantial differences between quarters in the period of time between the generation of a vacuum therein and the commencement of relevant milk flow therein, said information to said interested parties comprises that said sensor means be checked.

67. An apparatus in accordance with claim 1, wherein said monitoring means comprises sensor means in each said teat cup for determining whether said teat cup is connected to an appropriate teat of the animal being milked wherein when one or more of said sensor means provides data of a predetermined number of attempts to connect a relevant said teat cup to said animal's teats, said information transmitted to said interested parties is to the effect that said sensor means for automatically sensing the location of the teats of each said animal should be checked.

68. An apparatus in accordance with claim 1, wherein said monitoring means includes milk quantity production sensing means wherein on the basis thereof it is ascertained by said monitoring means that the quantity of milk obtained by said milking robot over a period of time deviates more than should be expected according to said stored further data, said transmitted information to said interested parties is that the milking robot should be checked.

69. An apparatus for automatically milking animals which comprises a milking robot, a computer, a plurality of monitoring means which monitor a plurality of physiological condition parameters of an animal to be milked, a separate monitoring program for each of said parameters installed in said computer whereby said computer can determine a diagnosis of a said physiological condition of an animal to be milked by a deviation in each said parameter and on the basis of comparison of data from said measuring means with reference data in said computer which relates to said parameters.

70. An apparatus in accordance with claim 69, wherein said computer is provided with adaptation means for continuously adapting said reference data on the basis of data provided from said monitoring means.

71. An apparatus in accordance with claim 69, wherein said computer is provided with automatic means for automatically generating said reference data.

72. An apparatus in accordance with claim 69, wherein said reference data are based on information relating to a group of animals to be milked by the apparatus.

73. An apparatus in accordance with claim 69, wherein said reference data are based on the intensity with which the apparatus is used.

74. An apparatus in accordance with claim 69, wherein said computer is connected to transmission means for transmitting data from said computer to an interested party remote from the apparatus wherein said party is a user of the apparatus or a service mechanic and said transmission means comprises a telephone or an SMS-message provider.

75. An apparatus in accordance with claim 69, wherein said monitoring means measures a milk flow profile of an animal being milked and when said milk flow profile is slow starting, pre-milking procedures for such animal are prolonged.

76. An apparatus in accordance with claim 69, wherein when said monitoring means detects for a particular quarter of an animal being milked a longer dead milking time, and a deviation in the color and volume of milk, the diagnosis determined by the apparatus is mastitis for said quarter.

77. An apparatus in accordance with claim 69, wherein said monitoring means monitors the speed of an animal being milked to empty a feeding trough which supplies feed to such animal while being milked and when said monitor detects an increased speed of emptying said feeding trough for such animal, the apparatus provides information to an interested party to check such animals' ration.

78. An apparatus in accordance with claim 69, wherein said monitoring means includes sensing means for sensing a speed of an animal being milked in consuming feed from a feeding trough which is a component of the apparatus and from which the animal being milked consumes feed while being milked wherein when said sensing means senses for such animal a decreased speed in consuming feed at said feeding trough, said computer relays information to an interested party that said feed provided at said feeding trough is spoiled or otherwise is not tasty.

79. An apparatus in accordance with claim 69, wherein said monitoring means comprise a milk flow sensor for sensing a deviating pattern of milk flow in each teat cup whereby when said milk flow sensor senses a deviating milk flow pattern in a teat cup, said computer provides a diagnosis whereby an interested party is informed that the relevant udder quarter of such animal should be checked.

80. An apparatus in accordance with claim 69, wherein said computer is programmed so that when said monitoring means transmit data of a deviation in the milk yield, the temperature, the feed consumption and the movement of a relevant animal, said computer relays information to an interested party of "attention heat."

81. An apparatus in accordance with claim 69, wherein said monitoring means includes means for monitoring the feed consumption of a particular animal which detects a decreased feed consumption by said particular animal, said computer relays information to an interested party to check the health of said particular animal.

82. An apparatus in accordance with claim 69, which comprises a weighing floor for weighing an animal being milked, said monitoring means being connected to said weighing floor whereby when there is a great divergence in measurements of weight received from said weighing floor by an animal being milked while supported by said weighing floor, said computer reports said animal as being unquiet to an interested party.

83. An apparatus in accordance with claim 69, which comprises a feeding trough, said monitoring means including a sensor of the weight of said feeding trough whereby when a great divergence in the measurements of the weight of said feeding trough take place while an animal is being milked in the apparatus, said computer relays information to an interested party that such animal being milked is unquiet.

84. An apparatus in accordance with claim 69, which comprises monitoring means for monitoring the speed of consumption of an animal being milked from a feeding trough which is a component of the apparatus whereby when said monitoring means senses a decreased speed by a particular animal in consuming feed from said feeding trough, said computer relays advice to an interested party to check the health of said particular animal.

85. An apparatus in accordance with claim 69, wherein said monitoring means monitors the visiting frequency of an animal to the apparatus to be milked and wherein when a decreased visiting frequency of a particular animal to the apparatus is detected by said monitoring means, said computer relays information to an interested party that the health of such animal should be checked.

86. An apparatus in accordance with claim 69, wherein said monitoring means includes means to detect too low of a milk yield of an animal which is milked by the apparatus in comparison with such animal's ration wherein when said comparison discloses that such animal's milk yield is too low, said computer relays information to an interested party that such animal's ration is not correct or that the activity of such animal should be checked.

87. An apparatus in accordance with claim 69, wherein said monitoring means comprises means for detecting the positions of the animal's teats and a drifting of the position of said teats in height whereby when said monitoring means detects said drifting of the teat positions of a particular animal in the height, said computer relays information to an interested party that said particular animal is suffering from dropsy or sagging udder or both.

88. An apparatus in accordance with claim 69, wherein said monitoring means includes sensing means for sensing the speed that an animal enters or leaves the apparatus wherein when said sensing means senses that a particular animal slowly enters or leaves the apparatus, information is relayed by said computer to an interested party to check the condition of the hooves of the relevant animal.

89. An apparatus for the automated milking of milk producing animals which consists essentially of a milking compartment, a milking robot, sensor means for automatically sensing the locations of teats of each said animal being milked by the apparatus, teat cups carried by said milking robot which are automatically connected to each relevant animal's teats by said robot as controlled by said sensor means, cleaning means for automatically cleaning the teats of each said animal being milked, a vacuum pump for providing milking vacuum and pulsating vacuum to milk and to pulsate said teat cups, a common container for receiving milk from each of said teat cups, a bulk milk cooling tank for receiving milk from said common container, a milk pipeline through which milk received from said milk producing animals flows, washing means for automatically washing said teat cups, said pipeline and said bulk milk cooling tank, and fluids for use by said washing means, milk flow meters for measuring the milk flow from each of said teat cups, milk conductivity measuring instruments for measuring the electrical conductivity of milk from each teat cup and a computer which controls the process of automated milking of the apparatus; the apparatus further comprising a plurality of monitoring means for monitoring the functions of the aforesaid components of the apparatus and the physiological condition of an animal being milked by the apparatus; data transmitting means transmitting said data from said monitoring means to said computer; a program in said computer for receiving said data and comparing it with reference data in said computer for prognosticating when a said component is likely to fail and for reporting the physiological conditions of animals being milked by the apparatus; and information transmission means for transmitting information to interested parties when a said component of the apparatus is likely to fail and should be repaired or replaced, and information to an interested party concerning the physiological condition of the animal being milked and procedures to be applied to each said animal in view of its physiological condition.

* * * * *